United States Patent [19]

Hlinka et al.

[11] Patent Number: 5,718,830

[45] Date of Patent: Feb. 17, 1998

[54] METHOD FOR MAKING MICROLENSES

[75] Inventors: Charles George Hlinka, Lebanon; Janet Louise Markham, Middlesex; Casimir Roman Nijander, Lawrenceville, all of N.J.; Keith Owen Mersereau, Northampton Township, Pa.; Yiu-Huen Wong, Summit, N.J.

[73] Assignee: Lucent Technologies Inc., Murray Hill, N.J.

[21] Appl. No.: 601,805

[22] Filed: Feb. 15, 1996

[51] Int. Cl.⁶ .................................. B44C 1/22; G02B 1/00
[52] U.S. Cl. ........................... 216/26; 216/58; 216/83; 430/321
[58] Field of Search ................... 216/26, 49, 58, 216/67, 83

[56] References Cited

U.S. PATENT DOCUMENTS

| 5,135,590 | 8/1992 | Basavanhally et al. | 156/64 |
| 5,286,338 | 2/1994 | Feldblum et al. | 156/643 |
| 5,310,623 | 5/1994 | Gal | 430/321 |
| 5,316,640 | 5/1994 | Wakabayashi et al. | 204/192.34 |

*Primary Examiner*—Nam Nguyen
*Assistant Examiner*—Michael E. Adjodha

[57] ABSTRACT

A method for making a microlens comprising the steps of uniformly distributing a volume of Poly (methylmethacrylate) (PMMA) across a major surface of a substrate, hardening the PMMA layer on the substrate surface, patterning the PMMA layer and forming patterned PMMA and reflowing the patterned PMMA to form at least one microlens on the substrate.

11 Claims, No Drawings

METHOD FOR MAKING MICROLENSES

FIELD OF THE INVENTION

The present invention relates to the fabrication of microlenses which are refractive microlenses from poly (methyl) methacrylate. Microlenses such as made herein find application for microlens arrays wherein they are used to improve the efficiency of photodetector arrays.

BACKGROUND OF THE INVENTION

Miniature lenses or microlenses are increasingly in demand for such purposes as coupling light from a laser to an optical fiber and coupling light from an optical fiber to a photodetector. The U.S. patent of Basavanhally, U.S. Pat. No. 5,135,590, granted Aug. 4, 1992, describes a method for arranging optical fibers in a matrix configuration as is required, for example, for free-space switching. Such uses would normally require a matrix array of microlenses for containing light projected from the optical fiber ends. Thus, considerable effort has been made in developing methods for making arrays of microlenses which can be used as a unit, or from which individual lenses can be selected for use.

One method for making microlens arrays comprises the steps of forming an array of photoresist elements on a silicon substrate, melting the elements to cause them to have curved or dome-shaped upper surfaces and thereafter solidifying the elements. The photoresist elements and the substrate are then subjected to reactive ion etching, that is, etching by reactive gases in which the reaction is enhanced by applied radio frequency power. The photoresist elements and the substrate are etched such that, after all of the photoresist has been etched, the dome shapes of the original photoresist elements are replicated in the silica substrate.

Methods of making microlenses in photoresist are known. However, poly (methyl) methacrylate (PMMA) by itself is not a photodefinable material adding complication to making microlenses using PMMA.

It is an object of the present invention to provide a method for making refractive microlenses with PMMA.

SUMMARY OF THE INVENTION

The present invention relates to a method for making a microlens using PMMA comprising the steps of distributing a volume of PMMA across the surface of a suitable substrate, hardening the PMMA layer on the substrate surface; patterning the PMMA layer and forming at least one microlens on the surface by reflowing the patterned PMMA layer. The PMMA may be dissolved in a quantity of a suitable solvent or mixture of solvents. Patterning may be accomplished by use of an overlying layer of photoresist that has been suitably exposed and developed. Prior to reflowing of the PMMA to form at least one microlens, the photoresist and PMMA are etched to remove the photoresist so that only patterned PMMA remains.

DETAILED DESCRIPTION OF THE INVENTION

In carrying out the method of the present invention, a PMMA solution is initially made up using a suitable solvent or mixture of solvents. Typical possible solvents include cellosolve acetate, γ-butyrolactone, propylene glycol methyl ether acetate, butyl acetate, n-methyl pyrrolidine, toluene, dimethyl formamide, diglyme and ethyl-3-ethoxyproprionate (EEP). A preferred solvent for the PMMA solution is a mixture of propylene glycol methyl ether acetate (PGMEA) and γ-butyrolactone. The solvents are so chosen so as to provide a smooth PMMA film on the substrate and also to insure safety in handling. The preferred mixture comprised from about 50 to about 75% by volume of PGMEA and from about 50 to about 25% by volume of γ-butyrolactone.

The amount of PMMA in the solvent can range from about 5 to 30% by weight of PMMA. The preferred range of PMMA is about 15 to 20% by weight of PMMA.

After making up the PMMA solution, this solution is spun onto a suitable wafer at spin speeds ranging from about 1000 to about 5000 rpm to obtain the desired PMMA solution film thickness. The wafer having the PMMA solution film is heated by giving it a soft bake in order to make the film on the wafer tack free. At this point, the wafer with the tack free film can be handled without damage to the film.

Because PMMA is not photodefinable, the PMMA film on the wafer must be patterned in order to provide distinct PMMA islands from which the microlens can be formed by reflowing through heating.

Patterning is accomplished by providing a photoresist layer onto the PMMA layer. The photoresist can be a positive photoresist or a negative photoresist. The particular nature of the photoresist is not critical. A mask is used to provide the patterning on the photoresist layer which corresponds to the desired microlens configuration. In general, this process involves placing a mask in proximity to or in contact with the PMMA/photoresist layer and exposing the photoresist through the mask. A standard photolithography process can be used to pattern the photoresist. In general, if a positive photoresist is used, the mask comprises opaque disks on a clear (preferably, glass) background. The mask is exposed with a lithography machine (a "mask aligner") which uses UV light to expose the photoresist through the glass mask. The exposed wafer is then developed. At the conclusion of this step, the wafer comprises an array of photoresist islands wherein the islands have the general configuration provided by the mask. Preferably, the photoresist islands are cylindrical resembling miniature hockey pucks. The hockey pucks now act as a mask.

The invention process then proceeds to replicate the hockey pucks into the PMMA layer. It is the objective of the invention to provide hockey puck PMMA islands with no PMMA film between the islands. This objective can be achieved by Reactive Ion Etching (RIE) with oxygen to etch both the PMMA and the photoresist. The photoresist is the sacrificial layer. Etch selectivity of the PMMA and the photoresist are calibrated so as to leave no photoresist on top of the PMMA hockey puck islands and to have no remaining PMMA film between the hockey puck islands. After etching, the wafer comprises an array of hockey pucks which can be processed into a microlens array. It should be noted that RIE etching is a preferred method and that other suitable etching methods which are well within the knowledge and skill of the artisan can be employed. Calibration of the etching so as to remove intervening PMMA and photoresist can be determined by routine experimentation.

After formation of the array of PMMA islands, the PMMA islands can be processed to convert them into microlenses. This is accomplished by reflowing the PMMA in a manner so as not to damage the PMMA and to pin the outside diameter of each of the PMMA microlenses.

Reflowing is obtained by heating the wafer at a temperature in the range of about 140°–200° C., preferably about 150°–180° C., most preferably 160° C. for a sufficient period of time to obtain pinning and refractive microlens formation.

Normally, heating is conducted over a minimum period of 30 seconds, preferably 2 minutes or longer. Heating can be accomplished by any known heating means, an example of which is heating on a hot plate. The heating temperature is critical only to the extent that if the temperature is too high, the PMMA cylindrical islands will flow together.

In general, the optimum temperature and time can be determined by routine experimentation. The lower temperature limit would be that temperature below which the PMMA hockey puck islands do not reflow into the desired microlens shape.

There are several known applications for microlens arrays. Of these, the most common is where they are used to improve the efficiency of photodetector arrays. In a detector array, one wants to collect as much light as possible in each detector element, or pixel. Within each pixel, some fraction of the pixel area is light-sensitive—this is called the "active area." Since one wants to collect lots of light, one might try to make the active area 100% of each pixel area, or a "fill factor" of 100%. The problem is, the larger the active area, the more "noise" one gets—electrical current from sources other than incoming light. One has to shrink the active area to optimize the signal-to-noise ratio (SNR). However, if one puts a microlens on top of each pixel, the lens will collect incoming light and focus it onto an active area that is smaller than the size of the lens. The lens can be close to the size of the pixel, thereby giving an effective fill factor close to 100%, whereas the active area of the pixel can be small, reducing noise. This can give a much more sensitive detector than one could otherwise hope to achieve.

This idea is currently implemented in some commercial charge-coupled device (CCD) arrays. CCDs are typically what is used for very small video cameras. But the microlenses used are made of photoresist. Photoresist and PMMA microlenses will typically have different material and/or optical properties, so for some applications one may prefer one over the other. Photoresist lenses for some applications are not desirable since the optical transmittance in the blue end of the optical spectrum is poor, at least with some photoresists. PMMA is transparent throughout the visible spectrum.

The substrate onto which the PMMA layer is coated may be of various materials. Typical but not limiting examples of useful substrates include silica, silicon, gallium arsenide, indium phosphide, zinc selenide, various glasses or sapphire.

The present invention is illustrated in the following examples. It is to be understood that the examples are illustrative only and not limiting of the scope of the claimed invention.

In the present examples the PMMA employed was a medium molecular weight PMMA purchased from Aldrich Chemical Co. The solvents employed were PGMEA and γ-butyrolactone. The makeup of the solvent was as follows:

65% PGMEA 35% γ-butyrolactone (v:v)

The preparation of a 15% solids PMMA solution was accomplished by adding 30 g PMMA to 170 ml of solvent makeup so as to obtain a 15% solids solution of medium molecular weight PMMA. Similarly a 20% solids PMMA solution is comprised of 40 g PMMA to 160 ml of solvent makeup.

The PMMA layer was obtained by spinning onto the wafer at spin speeds ranging from about 1000 to about 5000 rpm. Spin speed determines the desired PMMA layer thickness. Baking of the layer to remove solvent and form a tack free PMMA layer was conducted on a hot plate at a temperature of between about 100° C. and 200° C. for periods of time from about 2 minutes to about 90 minutes.

EXAMPLE 1

A 20% solids PMMA solution was spun onto a silicon wafer substrate and was prebaked on a hot plate at 150° C. for about 80 minutes. A resist layer comprising a Shipley 1400-31 resist was spun onto the substrate at 3000 rpm for about 30 seconds and soft baked at 100° C. for about 60 seconds. The resist layer was developed for 13 seconds in an APT developer (Shipley 455 developer) after exposure and hard baked at 120° C. for 30 minutes. The resist layer was etched by use of a Plasma Therm (Brand) reactive ion etcher (RIE). The RIE conditions were at partial pressure 15 μm, power=80% (240 Watts), oxygen gas flow at 5 sccm. Etching time was 19 minutes. After RIE etching microlens formation was obtained by heating of the etched wafer on a hot plate at about 160° C. for five (5) minutes. Surface profilometer traces showed 20 μm diameter lenses, with a height of 5.6 μm.

EXAMPLE 2

A 15% solids PMMA solution was spun onto a silicon wafer substrate at 2000 rpm giving a film thickness of about 2.8 μm and was prebaked on a hot plate at 150° C. for about 80 minutes. A resist layer comprising a Shipley 1400-31 resist was spun onto the substrate at 3000 rpm for 30 seconds and soft baked at 100° C. for about 60 seconds. The resist layer was developed after exposure for 13 seconds in an APT developer (Shipley 455 developer) and hard baked at 120° C. for 30 minutes. The resist layer was etched by use of reactive ion etching (RIE). The RIE conditions were at partial pressure 15 μm, power=80% 240 Watts), oxygen gas flow at 5 sccm. Etching time was about 7 minutes. After RIE etching microlens formation was obtained by heating of the etched wafer on a hot plate at about 160° C. for five (5) minutes. Surface profilometer traces showed 20 μm diameter lenses, with a 3.4 μm height.

EXAMPLE 3

A 20% solids PMMA solution was spun onto a silicon wafer substrate at 1000 rpm giving a height of 4.5 μm and was prebaked on a hot plate at 150° C. for about 80 minutes. A resist layer comprising a Shipley 1400-31 resist was spun onto the substrate at 3000 rpm for 30 seconds and soft baked at 10020 C. for about 60 seconds. The resist layer after exposure was developed for 13 seconds in an APT developer (Shipley 455 developer) and hard baked at 120° C. for 30 minutes. The resist layer was etched by use of reactive ion etching (RIE). The RIE conditions were at partial pressure 15 μm, power=80% (240 Watts), oxygen gas flow and 5 sccm. Etching time was 19 minutes. After RIE etching microlens formation was obtained by heating of the etched wafer on a hot plate at about 160° C. for five (5) minutes. Surface profilometer traces showed 20 μm diameter lenses, with a 3.6 μm height and 50 μm diameter lenses, with a height of 5.1 μm; and 40 μm diamter lenses, with a height of about 4.2 μm.

While the invention has been illustrated and described in the preferred embodiments of the invention, it is to be understood that these embodiments are capable of variation and modification, and, therefore, the invention is not to be limited to the precise details set forth. The inventors avail themselves of such changes and alterations as falling within the purview of the appended claims.

What is claimed is:

1. A method for making a microlens comprising the steps of:

uniformly distributing a volume of Poly(methyl methacrylate) (PMMA) across a major surface of a substrate;

hardening the PMMA layer on the substrate surface;

patterning the PMMA layer and reflowing the patterned PMMA to form at least one microlens on the substrate; wherein the PMMA is distributed in the form of a solution of PMMA in a solvent.

2. The method of claim 1 wherein the PMMA is distributed on the substrate by spinning or spraying.

3. The method of claim 1, wherein hardening of the PMMA layer is obtained by heating to remove the solvent.

4. The method of claim 1, wherein the PMMA is etched after patterning an overlying layer of photoresist.

5. The method of claim 1, wherein reflowing the patterned PMMA is obtained by heating the patterned PMMA.

6. A mcirolens formed by the process of any one of claims 1, 2, 3, 4 or 5.

7. A method for making a microlens comprising the steps of:

dissolving a quantity of Poly(methyl methacrylate) (PMMA) in a solvent;

uniformly distributing the solvent containing the PMMA across a major surface of a substrate;

driving off the solvent and hardening to form a PMMA layer;

patterning the PMMA layer with an overlying layer of photoresist that has been suitably exposed and developed;

etching the photoresist and PMMA to remove the photoresist and unwanted PMMA so that only the patterned PMMA remains; and creating at least one microlens by reflowing the patterned PMMA.

8. The method of claim 7, wherein the photoresist is a positive photoresist or a negative photoresist.

9. The method of claim 7, wherein the etching is obtained by reactive ion etching (RIE) or ion milling, or plasma etching, or other etching means.

10. The method of claim 9, wherein the etching is obtained by RIE.

11. A microlens formed by the process of any one of claims 7, 8, 9 or 10.

* * * * *